United States Patent [19]
Chundury et al.

[11] Patent Number: 6,150,442
[45] Date of Patent: Nov. 21, 2000

[54] FLAME RETARDANT POLYPROPYLENE COMPOSITION

[75] Inventors: Deenadayalu Chundury, Newburgh; Roy Sanford, Dale, both of Ind.

[73] Assignee: Ferro Corporation, Cleveland, Ohio

[21] Appl. No.: 09/224,334

[22] Filed: Dec. 31, 1998

[51] Int. Cl.$^7$ .................................................. C08L 5/52
[52] U.S. Cl. ........................................... 524/127; 524/505
[58] Field of Search ...................... 524/127, 505

[56] References Cited

U.S. PATENT DOCUMENTS

| | | | |
|---|---|---|---|
| 4,049,754 | 9/1977 | Weil | 260/952 |
| 4,795,782 | 1/1989 | Lutz et al. | 525/66 |
| 5,198,495 | 3/1993 | Fasulo et al. | 525/71 |
| 5,264,280 | 11/1993 | Chundury et al. | 428/330 |
| 5,266,618 | 11/1993 | Watanabe et al. | 524/405 |
| 5,278,231 | 1/1994 | Chundury | 525/66 |
| 5,280,074 | 1/1994 | Schreck et al. | 525/240 |
| 5,374,680 | 12/1994 | Chundury et al. | 525/71 |
| 5,385,781 | 1/1995 | Chundury et al. | 428/330 |
| 5,391,618 | 2/1995 | Yamamoto et al. | 525/88 |
| 5,576,374 | 11/1996 | Betso et al. | 524/451 |
| 5,608,008 | 3/1997 | Miyata et al. | 525/240 |
| 5,639,816 | 6/1997 | Yamaguchi et al. | 524/451 |
| 5,639,829 | 6/1997 | Yamaguchi et al. | 525/240 |
| 5,688,866 | 11/1997 | Silvis et al. | 525/127 |

OTHER PUBLICATIONS

Chundury et al., "Metallocene Based Polyolefin Alloys And Their Applications," Worldwide Metallocene Conference, Metcon May 1994, Houston, Texas.

Chundury et al., "Applications For Metallocene Based Resins: A Reality Check," SPE ANTEC, May 1995, Boston, Massachusetts.

Chundury et al., "Performance Properties And Potential Applications Of Metallocene Based Polyolefin Compounds," Worldwide Metallocene Conference, Metcon, May 1995, Houston, Texas.

*Primary Examiner*—Peter D. Mulcahy
*Attorney, Agent, or Firm*—Rankin, Hill, Porter & Clark LLP

[57] ABSTRACT

The present invention provides a new and improved flame retardant polypropylene composition that exhibits substantially no bloom and plate-out during processing and use. In a preferred embodiment the composition comprises a homopolymer or copolymer of polypropylene, a styrene butadiene compatibilizer, a bromine and phosphorus containing flame retardant additive and a metallocene ethylene copolymer. In addition to displaying excellent color development characteristics, the composition of the present invention displays excellent physical properties and a UL94 rating of V-2.

7 Claims, No Drawings

FLAME RETARDANT POLYPROPYLENE COMPOSITION

TECHNICAL FIELD

The present invention concerns a polypropylene blend. More particularly, the present invention concerns a flame retardant polypropylene composition that exhibits least bloom, plate-out and excellent color development properties.

BACKGROUND

The use of flame retardant additives in polymer resin systems is well-known in the prior art. Various different additive systems are commercially available for use in incorporating into polymer resins and systems or blends. Such additives serve to impart flame retardant/resistant properties to the polymers they are added to.

The use of flame retardant additives in polypropylene containing and based polymer systems is also well-known in the prior art. Flame retardant polypropylenes are used in a wide variety of applications where flame retardant properties are required. Examples of such applications include electronic components and parts, household fixtures and accessories such as furniture and fabric, and automotive and appliance parts such as control panels, clothes baskets or drums, dashboards, seat covers and carpeting.

Unfortunately, the use of flame retardant additives in polypropylene compositions can result in undesirable color development or blooming. In other words, the additive can detrimentally affect the color of the polypropylene composition. In many applications, this color development problem is undesirable, or even, unacceptable.

SUMMARY OF INVENTION

The present invention provides a new and improved flame retardant polypropylene composition that exhibits substantially no bloom during processing and use. The composition also exhibits excellent moldability and it may be easily colored.

In a preferred embodiment the composition comprises a homopolymer or copolymer of polypropylene, a styrene butadiene compatibilizer, a bromine containing flame retardant additive and a metallocene ethylene copolymer. The bromine containing flame retardant additive comprises tris (tribromoneopentyl) phosphate.

In addition to displaying excellent color development characteristics, the composition of the present invention displays excellent physical properties and a UL94 rating of V-2.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

As further discussed below, the inventive composition of the present invention comprises a blend of (I) at least one polyolefin, (II) a compatibilizer comprising a block polymer of a vinyl aromatic monomer and a conjugated diene, a partially hydrogenated derivative thereof to which has been grafted an unsaturated carboxylic reagent, (III) a bromine containing flame retardant additive; and (IV) a metallocene ethylene copolymer.

Polyolefin (I)

The polymer composition includes a conventional semicrystalline homopolymer or copolymer of polypropylene or mixtures of such homopolymer and copolymer. The polymer blend comprises in weight percent from about 50% to about 85%, preferably from about 55% to about 80%, and more preferably from about 55% to about 75% of such conventional semicrystalline homopolymer or copolymer of polypropylene or mixtures thereof.

The number average molecular weight of the polypropylene polymers is preferably above about 10,000 and more preferably above about 50,000. Such polypropylene polymers are preferably produced using a Ziegler catalyst. The polypropylene polymers useful in preparing the polymer blends of the present invention are well-known to those skilled in the art and many are commercially available. Examples of such commercially available semicrystalline polypropylenes include Aristech F007S and F007F, Shell 7C06 and 5A97, Exxon PD7/32, Lyondell X0200 and X0201, Aristech 4007F and 4040F (copolymer of propylene and ethylene), Equistar 51S12A and Quantum PP8479HV.

Compatibilizer (II)

The polymer composition also includes a block polymer of a vinyl aromatic monomer and a conjugated diene, a partially hydrogenated derivative thereof, or a selectively hydrogenated derivative thereof to which has been grafted an unsaturated carboxylic reagent. To the best of Applicants' knowledge, the use of any one specific compatibilizer is not critical. The block polymer of a vinyl aromatic monomer and an aliphatic conjugated diene is typically present in an amount from about 2%, or about 3% up to about 30%, or to about 25% by weight of the polymer composition. The block polymer contains up to about 50% bound vinyl aromatic monomer. In one embodiment, contains up to about 48%, or to about 45% bound vinyl aromatic monomer.

The block polymers, usually block copolymers, may be diblock, triblock, multiblock, starblock, polyblock or graftblock polymers. Throughout this specification and claims, the terms diblock, triblock, multiblock, polyblock, and graft or grafted-block with respect to the structural features of block polymers are to be given their normal meaning as defined in the literature such as in the Encyclopedia of Polymer Science and Engineering, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block polymers may contain various ratios of conjugated dienes to vinyl aromatic monomer. Accordingly, multi-block polymers may be utilized which are linear or radial symmetric or asymmetric and which have structures represented by the formulae A-B, A-B-A, A-B-A-B, B-A-B, $(AB)_{0,1,2}$ . . . BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered polymer blocks can be incorporated in the multi-block copolymers by copolymerizing a mixture of conjugated diene and vinyl aromatic monomer monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

The vinyl aromatic monomers which may be utilized to prepare the copolymers are described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, preferably from about 40,000 to about 300,000.

The average molecular weights of the individual blocks within the polymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10 to about 80%, and the vinyl content is preferably from about 25 to about 65%, particularly 35 to 55% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, alpha-methylstyrene-isoprene-alpha-methylstyrene, and their partially hydrogenated derivatives. The diblock and triblock polymers are commercially available from a variety of sources under various trade names. An example of a commercially available diblock resin includes Solprene 314D (Phillips). A number of styrene-butadiene-styrene triblock polymers are sold by the Shell Chemical Company under the trademarks "Kraton 2103", "Kraton 2104", and "Kraton 2113". Such thermoplastic rubbery block polymers are made by anionic polymerization, and the above three identified Shell Kratons differ in molecular weight and viscosity, and also in the ratio of butadiene to styrene. For example, "Kraton 2103" and "Kraton 2113" have a styrene to butadiene ratio of 28:72 while "Kraton 2104" as a styrene to butadiene ratio of 30:70. Blends of diblock and triblock polymers are also available. Kraton 1118 (Shell) is a blend of SB diblock and SBS triblock polymers. A particularly useful styrene-butadiene block copolymer is Kraton G1701X.

Multiblock polymers of styrene and either isoprene or butadiene also are commercially available. Commercially available and preferred styrene-butadiene multiblock polymers include Stereon 841A (43% styrene:57% butadiene) and Stereon 845A which are available from The Firestone Tire & Rubber Company.

Radial or starblock copolymers are available from Fina under the general designation "Finaprene SBS Polymer". A particularly useful radial or starblock polymer is available commercially under the designation "Finaprene 414".

The selective hydrogenation of the block polymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5 to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-styrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed as isoprene, the resulting hydrogenated product resembles a regular polymer block of ethylene and propylene (EP). One example of a commercially available selectively hydrogenated is Kraton G-1652 which is a hydrogenated SBS triblock comprising 30% styrene end blocks and a midblock equivalent is a polymer of ethylene and 1-butene (EB). This hydrogenated block polymer is often referred to as SEBS.

In another embodiment, the selectively hydrogenated block polymer is of the formula

wherein n=0 or 1; o is 1 to 100; and p is 0 or 1;

and each B prior to hydrogenation is predominantly a polymerized conjugated diene hydrocarbon block having a number average molecular weight of about 20,000 to about 450,000;

and each A is predominantly a polymerized vinyl aromatic monomer block having a number average molecular weight of from about 2000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, //and the average unsaturation of the hydrogenated block polymer is reduced to less than 20% of its original value//.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, esters, etc., which are capable of being grafted onto the selectively hydrogenated block polymer. The grafted polymer will usually contain from about 0.2 to about 20%, and preferably from about 0.1 to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429; 4,657,970; and 4,795,782, and the disclosures of these patents relating to grafted selectively hydrogenated block polymers conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated polymers of styrene and butadiene include Kraton FG1901X from Shell, often referred to as a maleated selectively hydrogenated SEBS polymer.

Flame Retardant Additive (III)

The flame retardant additive comprises a combination of both bromine and phosphorus. An example of a preferred additive is tris(tribromoneopentyl) phosphate. An example of a commercially available material is Recflam PB-370 additive available from FMC Chemical of Manchester, England. Such additives are generally available on a commercial basis in combination with a synergist such as antimony oxide and they are many times sold dispersed within a carrier polymer resin. An example of such a product is ENDURA FR-6653 available from Polymer Products Company, Inc. of Stockertown, Pa. FR-6653 comprises antimony trioxide, a bromine and phosphorus containing flame retardant additive (tris(tribromoneopentyl) phosphate) and polypropylene homopolymer. The flame retardant additive is present in the polymer composition from about 1% to about 10%, and preferably from about 2% to about 8% by weight of the composition. Preferably, the flame retardant additive is utilized along with a conventional synergist material. An example of a suitable synergist is antimony trioxide.

Metallocene Ethylene Copolymer (IV)

The polymer composition also includes a specific class of metallocene polyolefins. Specifically, such class of polyolefins comprises an ethylene copolymer made using a metallocene catalyst or an equivalent single site metal catalyst. Such copolymers include ethylene-butene, propylene, hexene or octene copolymers made using a metallocene or equivalent single site catalyst. Such ethylene copolymers suitable for use in the present invention display a melting point below about 105° C. Such ethylene-butene or hexene copolymers are available commercially from Exxon Chemicals of Houston, Tex., under the trade designation Exact. An example of a preferred commercially available ethylene copolymer suitable for use in the present invention is a saturated ethylene-octene copolymer sold under the trade designation Engage 8100 or POE-8999 by DuPont Dow Elastomers of Wilmington, Del.

The ethylene copolymer is typically present in the blend in an amount from about 0.5%, or about 1% up to about 30%, or to about 20% by weight of the polymer blend composition. Generally, the ethylene copolymer is preferably present in the blend in an amount from about 3% to about 15% by weight of the polymer blend composition.

Fillers

The polymer blend composition may also include fillers such as calcium carbonate ($CaCO_3$), mica, talc, wollastonite, fibers or mixtures of the foregoing. The polymer blend generally comprises in weight percent from about 0% to about 30%, or from about 5% to about 20% filler. The non-fiber type fillers preferably have an average particle size of from about 1 to about 14 microns. Preferably, the fillers are used in as dry a state as reasonably practical. The fibers may be either organic or mineral (inorganic) in nature. Also, mixtures of fibers may be employed. Suitable fiber materials include, for example, glass fibers, carbon fibers, jute and synthetic polymer fibers.

Miscellaneous Additives

Various additives may be included in the polymer blend composition at various rates of addition. Such additives include, for example, light stabilizers, heat stabilizers, antioxidants, lubricants, etc. Generally, additives are included in the polymer blend at a rate of less than 3% by weight, and preferably less than 2% by weight of the polymer blend composition.

Colorants

The polymer blend compositions of the present invention also generally include colorants or pigments. Such materials may be organic or inorganic and are well-known in the art. Generally, colorants or pigments are included in the polymer blend at a rate of less than 20% by weight, and preferably less than 10% by weight of the polymer blend composition.

Additional Polymers

It will be appreciated that polymer blend compositions made in accordance with the present invention may include one or more additional polymeric materials such as, for example elastomers or rubbers such as silicone rubbers or styrene-butadiene materials, maleated materials, styrenic materials, etc. These additional polymers would be present in an amount less than 10% by weight and preferably less than 5% by weight of the polymer blend composition.

Preparation of Polymer Compositions

The blended polymer compositions of the present invention can be prepared by techniques well-known to those skilled in the art. For example, a particularly useful procedure is to intimately mix the polymers using conventional melt mixing equipment such as a mill, a Banbury, a Brabender, a single or twin screw extruder, continuous mixers, kneaders, etc. For example, the polymers may be intimately mixed in the form of granules and/or powder in a high shear mixer. One preferred process for preparing the blended polymers utilizes the Farrell Compact Processor, CP-23 and CP-57. Short residence times and high shear are readily obtained in a CP-23 and a CP-57. "Intimate" mixing means that the mixture is prepared with sufficient mechanical shear and thermal energy to produce a dispersed phase which is finely divided and homogeneously dispersed in the continuous or principal phase.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLE I

The following composition was prepared in accordance with the present invention on a Farrell Compact Processor, CP-57 at a mixer rotor speed of about 500 rpm and extruded at about 200° C. into strands which are passed through a water bath and air wipe prior to pelletizing.

| Component | Composition No. - Weight % 1 |
|---|---|
| Polypropylene Homopolymer (Equistar 51S12A) | 68.15 |
| Phillips SB Block Copolymer (KR-03) | 6.00 |
| Lubricant (Strucktol TR016) | 0.05 |
| Stabilizer (Ciba ANOX 20) | 0.30 |
| Ethylene Copolymer, Metallocene (DuPont Dow Engage 8100) | 10.0 |
| Black Color Concentrate (Southwest Chemical 3950) | 6.0 |
| Flame Retardant Additive* | 9.5 |

*ENDURA FR-6653 comprising by weight about 42% tris (tribromoneopentyl) phosphate, 22% antimony trioxide and about 33% polypropylene homopolymer.

Example II

The following compositions were prepared in accordance with the procedure discussed above in Example I. Compositions 5 and 6 were prepared in accordance with the present invention and they displayed no meaningful bloom. Compositions 2–4 are controls, showing that in the absence of all of the required components, a composition will not perform in the same manner as compositions made in accordance with the present invention.

| | Composition No. - Weight % | | | | |
|---|---|---|---|---|---|
| Component | 2 | 3 | 4 | 5 | 6 |
| Polypropylene Homopolymer (Equistar 51S12A) | 89.2 | 84.2 | 74.2 | 68.2 | 68.15 |
| Phillips SB Black Copolymer (KR-03) | — | — | — | 6.00 | 6.00 |
| Lubricant (Strucktol TR 016) | — | — | — | — | 0.05 |
| Stabilizer (Ciba Irganox 1010) | 0.3 | 0.3 | 0.30 | 0.30 | 0.30 |
| Ethylene Copolymer, Metallocene (DuPont Dow Engage 8100) | — | — | 10.00 | 10.00 | 10.00 |
| Black Color Concentrate (Southwest Chemical 3950) | 1 | 6 | 6.00 | 6.00 | 6.00 |
| Flame Retardant Additive ENDURA FR-6653 | 9.5 | 9.5 | 9.50 | 9.50 | 9.50 |
| Performance Properties: | | | | | |
| Flammability rating* | V-2 | V-2 | V-2 | V-2 | V-2 |
| Bloom & Finger Prints, in-house rating (oven aging @ 150F & 78 hours) | 5 (severe) | 5 (severe) | 2 | 1 | 1 |
| Gardner impact resistance (inch pounds) | 30 | 36 | >200 | >200 | >200 |
| Elongation at break (%) | 17 | 36 | >60 | >60 | >60 |

*per UL94 Test Procedures

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed is:

1. A flame retardant polypropylene containing a composition comprising a blend of:
   (I) a homopolymer or a copolymer of polypropylene or a mixture of such homopolymer and copolymer;
   (II) a compatibilizer comprising a block polymer of a vinyl aromatic monomer and a conjugated diene, a partially hydrogenated derivative thereof, or a selectively hydrogenated derivative thereof to which has been granted an unsaturated carboxylic reagent;
   (III) a bromine containing flame retardant additive comprising tris(tribromoneopentyl) phosphate; and
   (IV) an ethylene copolymer made using a metallocene catalyst.

2. A flame retardant polypropylene composition as set forth in claim 1 wherein said composition comprises by weight from about 1% to about 10% flame retardant additive (III), from about 3% to about 30% said metallocene ethylene copolymer (IV), from about 50% to about 85% said homopolymer or copolymer of polypropylene (I), and from about 2% to about 30% of said compatibilizer (II).

3. A flame retardant polypropylene composition as set forth in claim 1 wherein said ethylene copolymer (IV) comprises an ethylene-butene, propylene, lexene or octene copolymer made using a metallocene catalyst.

4. A flame retardant polypropylene composition as set forth in claim 1 wherein said ethylene copolymer (IV) comprises an ethylene-octene copolymer.

5. A flame retardant polypropylene composition as set forth in claim 1 wherein said homopolymer or copolymer of polypropylene (I) comprises semicrystalline material.

6. A flame retardant polypropylene composition as set forth in claim 1 wherein said composition includes one or more additives from the group consisting of light stabilizers, lubricants, heat stabilizers and antioxidants.

7. A flame retardant polypropylene composition as set forth in claim 1 wherein said composition includes a filler.

* * * * *